(12) United States Patent
Yoshida et al.

(10) Patent No.: US 8,512,589 B2
(45) Date of Patent: Aug. 20, 2013

(54) MN—ZN FERRITE CORE AND METHOD FOR PRODUCING THE SAME

(75) Inventors: Hirofumi Yoshida, Chiba (JP); Yukiko Nakamura, Chiba (JP); Satoshi Goto, Okayama (JP)

(73) Assignee: JFE Chemical Corporation, Tokyo (JP)

( * ) Notice: Subject to any disclaimer, the term of this patent is extended or adjusted under 35 U.S.C. 154(b) by 231 days.

(21) Appl. No.: 13/146,839

(22) PCT Filed: Jan. 29, 2010

(86) PCT No.: PCT/JP2010/051649
§ 371 (c)(1), (2), (4) Date: Jul. 28, 2011

(87) PCT Pub. No.: WO2010/087514
PCT Pub. Date: Aug. 5, 2010

(65) Prior Publication Data
US 2011/0279217 A1    Nov. 17, 2011

(30) Foreign Application Priority Data
Jan. 29, 2009    (JP) .................... 2009-018827

(51) Int. Cl.
*H01F 1/34* (2006.01)
*C09B 35/38* (2006.01)

(52) U.S. Cl.
USPC .......... 252/62.62; 264/611; 264/661

(58) Field of Classification Search
USPC .............. 252/62.62; 264/611, 661
See application file for complete search history.

(56) References Cited

U.S. PATENT DOCUMENTS
8,404,142 B2 *   3/2013   Yoshida et al. ............ 252/62.59

FOREIGN PATENT DOCUMENTS
| JP | 2002-128570 | 5/2002 |
|---|---|---|
| JP | 2005-109356 | 4/2005 |
| JP | 2005-272229 | 10/2005 |
| JP | 2006-151701 | 6/2006 |
| JP | 2006-273673 | 10/2006 |
| JP | 2008-143744 | 6/2008 |

OTHER PUBLICATIONS
International Search Report, PCT/JP2010/051649, May 25, 2010.

* cited by examiner

*Primary Examiner* — Carol M Koslow
(74) *Attorney, Agent, or Firm* — Young & Thompson

(57) ABSTRACT

Disclosed is a MnZn ferrite core comprising basic components, subcomponents and unavoidable impurities. To the basic components comprising: iron oxide (as $Fe_2O_3$): 51.0-54.5 mol %, zinc oxide (as ZnO): 8.0-12.0 mol % and manganese oxide (as MnO): remainder, are added silicon oxide (as $SiO_2$): 50-400 mass ppm and calcium oxide (as CaO): 50-4000 ppm as subcomponents and in the unavoidable impurities, phosphorous, boron, sulfur and chlorine are respectively kept to: less than 3 mass ppm, less than 3 mass ppm, less than 5 mass ppm, and less than 10 mass ppm. The ratio of the measure specific surface area to the ideal specific surface area of the MnZn ferrite core satisfies the formula: Measured specific surface area/ideal specific surface area<1500.

7 Claims, 2 Drawing Sheets

OBSERVATION

A-A SECTION

IDEAL SPECIFIC SURFACE = $[2 \times \{(\text{OUTER DIAMETER})^2 - (\text{INNER DIAMETER})^2\}/4 \times \pi + \{(\text{OUTER DIAMETER}) + (\text{INNER DIAMETER})\} \times \pi \times \text{HEIGHT}] / \text{CORE MASS}$ COMPRESSIVE RUPTURE STRENGTH
OF GRANULATED POWDER = 0.80 MPa
→ DENSE COMPRESSIVE RUPTURE STRENGTH
OF GRANULATED POWDER = 1.41 MPa
→ CAVITIES REMAIN

MN—ZN FERRITE CORE AND METHOD FOR PRODUCING THE SAME

TECHNICAL FIELD

The present invention relates to a Mn—Zn ferrite core that is suitably used as, for example, a magnetic core for a pulse transformer in an Ethernet (registered trademark) device; and a method for producing such a Mn—Zn ferrite core.

BACKGROUND ART

Ethernet devices include pulse transformers for the purpose of achieving impedance match and electrical insulation in input/output terminals. Such transformers include magnetic cores generally composed of soft magnetic materials. Such pulse transformers are required to have a high incremental permeability μΔ under the application of a direct-current magnetic field in a temperature range of −40 to 85° C., for example, as defined in American standards ANSI X3.263-1995[R2000]. The incremental permeability μΔ is a value that indicates the degree of magnetization of a magnetic core (core) under the application of a magnetic field.

With a progress in the communication technology in recent years, in Ethernet devices, there has been a trend toward, in addition to a higher transmission speed, a direct supply of driving power of such devices together with transmission signals. In this case, pulse transformers are used under conditions in which large currents may be superposed, compared with conventional conditions. Furthermore, since components around magnetic cores (cores) of pulse transformers within devices generate heat due to such large currents, the temperature of the environment in which the cores are used probably increases.

Accordingly, Mn—Zn ferrite used in such an application is demanded to have a high inductance, that is, a high incremental permeability μΔ, at a higher temperature and under superposition of higher magnetic fields.

A soft magnetic material used in the application is generally Mn—Zn ferrite and various improvements have been proposed.

For example, Patent Literature 1 discloses a technique in which Mn—Zn ferrite is made to contain cobalt oxide to thereby improve magnetic characteristics at a high temperature. However, since Mn—Zn ferrite for magnetic cores of pulse transformers has been designed in terms of composition so as to have a high initial permeability $\mu_i$, such Mn—Zn ferrite has a low saturation flux density and hence it is difficult to achieve a sufficiently high incremental permeability μΔ at a high temperature and in a high magnetic field.

Patent Literature 2 proposes that reduction in phosphorus and boron are effective to increase incremental permeability μΔ. However, Mn—Zn ferrite disclosed in Patent Literature 2 has a composition selected for the purpose of reduction in core loss and an increase in effective permeability at 100° C. Accordingly, the Mn—Zn ferrite has too low an initial permeability $\mu_i$ at room temperature or less, which is not described in Examples, and hence it is unlikely that the Mn—Zn ferrite has a sufficiently high incremental permeability μΔ in a low-temperature environment.

The above-described impurities are defined in techniques disclosed in Patent Literatures 3 to 6.

Patent Literature 3 proposes a technique in which the content of chlorine is defined to achieve improvements in terms of core loss and amplitude ratio permeability at 100° C. or more. However, it is impossible to make an incremental permeability μΔ at 23° C. be 200 or more by defining the content of chlorine only.

Patent Literature 4 proposes a technique in which the content of sulfur is defined to achieve improvements in terms of power loss. However, it is impossible to make an incremental permeability μΔ at 23° C. be 200 or more by defining the content of sulfur only.

Patent Literature 5 proposes a technique in which the contents of phosphorus, boron, sulfur, and chlorine are defined to suppress exaggerated grain growth in ferrite so that adverse influence on characteristics of ferrite is suppressed. This technique allows a Mn—Zn ferrite having a high resistivity and a small squareness ratio. However, the Mn—Zn ferrite does not have a sufficiently high incremental permeability μΔ in a high magnetic field.

Patent Literature 6 proposes a technique in which the content of phosphorus in a CoO-added ferrite is made very low to suppress exaggerated grain growth in the ferrite so that a high effective permeability is achieved under the application of a direct-current magnetic field. However, since the content of ZnO is high, this technique allows a high incremental permeability μΔ in a low magnetic field of 33 A/m but does not allow a sufficiently high incremental permeability μΔ in a high magnetic field of 80 A/m.

As described above, no existing technique allows a sufficiently high incremental permeability μΔ at a high temperature and in a high magnetic field. To overcome such a problem, the inventors of the present invention developed a Mn—Zn ferrite core having the following configuration and disclosed it in Patent Literature 7:

"A Mn—Zn ferrite core comprising a basic component, sub-components, and unavoidable impurities,
wherein, as the sub-components,
   silicon oxide (in terms of $SiO_2$): 50 to 400 mass ppm, and
   calcium oxide (in terms of CaO): 50 to 4000 mass ppm; are added to the basic component consisting of
   iron oxide (in terms of $Fe_2O_3$): 51.0 to 54.5 mol %,
   zinc oxide (in terms of ZnO): 8.0 to 12.0 mol %, and
   manganese oxide (in terms of MnO): balance and amounts of phosphorus, boron, sulfur, and chlorine in the unavoidable impurities are reduced as follows
      phosphorus: less than 3 mass ppm,
      boron: less than 3 mass ppm,
      sulfur: less than 5 mass ppm, and
      chlorine: less than 10 mass ppm."

CITATION LIST

Patent Literature 1: Japanese Unexamined Patent Application Publication No. 2004-196632
Patent Literature 2: Japanese Unexamined Patent Application Publication No. 7-297020
Patent Literature 3: Japanese Unexamined Patent Application Publication No. 2006-213532
Patent Literature 4: Japanese Unexamined Patent Application Publication No. 2001-64076
Patent Literature 5: Japanese Unexamined Patent Application Publication No. 2005-179092
Patent Literature 6: Japanese Unexamined Patent Application Publication No. 2007-197246
Patent Literature 7: Japanese Patent Application No. 2008-13135

SUMMARY OF INVENTION

Technical Problem

As a result of the development of the Mn—Zn ferrite core disclosed in Patent Literature 7 above, a higher incremental permeability μΔ can be achieved at a high temperature and in a high magnetic field than before.

The present invention relates to an improvement of the Mn—Zn ferrite core and is intended to further increase the incremental permeability μΔ.

Solution to Problem

Features of the present invention are as follows.
1. A Mn—Zn ferrite core comprising a basic component, sub-components, and unavoidable impurities,
wherein, as the sub-components,
silicon oxide (in terms of $SiO_2$): 50 to 400 mass ppm and
calcium oxide (in terms of CaO): 50 to 4000 mass ppm are added to the basic component consisting of
    iron oxide (in terms of $Fe_2O_3$): 51.0 to 54.5 mol %,
    zinc oxide (in terms of ZnO): 8.0 to 12.0 mol %, and
    manganese oxide (in terms of MnO): balance; amounts of phosphorus, boron, sulfur, and chlorine in the unavoidable impurities are reduced as follows
    phosphorus: less than 3 mass ppm,
    boron: less than 3 mass ppm,
    sulfur: less than 5 mass ppm, and
    chlorine: less than 10 mass ppm; and
a ratio of a measured specific surface of the Mn—Zn ferrite core to an ideal specific surface of the Mn—Zn ferrite core satisfies formula (I) below $$\text{Measured specific surface/ideal specific surface} < 1500 \quad (1)$$

where the measured specific surface represents a specific surface ($m^2/g$) determined by a BET method (multipoint method) in JIS Z 8830 (2001); and the ideal specific surface represents a specific surface ($m^2/g$) calculated from size and mass of the core on an assumption that the core is in an ideal state of having no cavities.
2. The Mn—Zn ferrite core according to 1 above, wherein the sub-components further include
    Cobalt oxide (in terms of CoO): 50 to 3000 mass ppm.
3. The Mn—Zn ferrite core according to 1 or 2 above, wherein the sub-components further include one or more selected from zirconium oxide (in terms of $ZrO_2$): 0.005 to 0.075 mass %;
    tantalum oxide (in terms of $Ta_2O_5$): 0.005 to 0.075 mass %;
    hafnium oxide (in terms of $HfO_2$): 0.005 to 0.075 mass %; and
    niobium oxide (in terms of $Nb_2O_5$): 0.005 to 0.075 mass %.
4. A method for producing the Mn—Zn ferrite core according to any one of 1 to 3 above, the method comprising calcining the basic component according to 1 above to provide a calcined powder, mixing the calcined powder with the sub-components according to any one of 1 to 3 above, subsequently granulating the mixture of the calcined powder with the sub-components into a granulated powder having a compressive rupture strength of 1.10 MPa or less, and then compacting and subsequently firing the granulated powder.

Advantageous Effects of Invention

According to the present invention, a Mn—Zn ferrite core having excellent characteristics can be obtained in which, under the application of a direct-current magnetic field of 80 A/m, the incremental permeability μΔ is continuously 400 or more in a wide temperature range of 0 to 85° C. and the incremental permeability μΔ at 65° C. is 700 or more.

DESCRIPTION OF EMBODIMENTS

Figure 1:
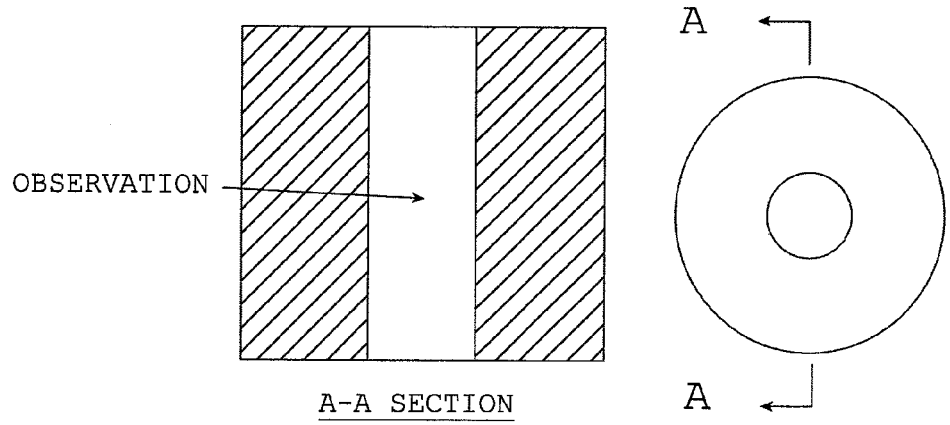
FIG. 1 illustrates a section of a Mn—Zn ferrite core, the section being observed for cavities.
Figure 2A:
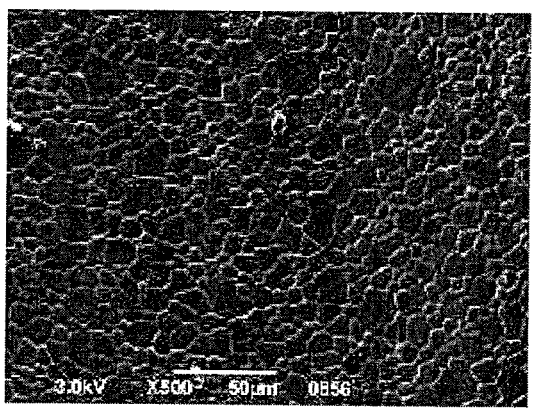
FIG. 2(a) illustrates a state of a core according to the present invention in which no cavities remain.
Figure 2B:
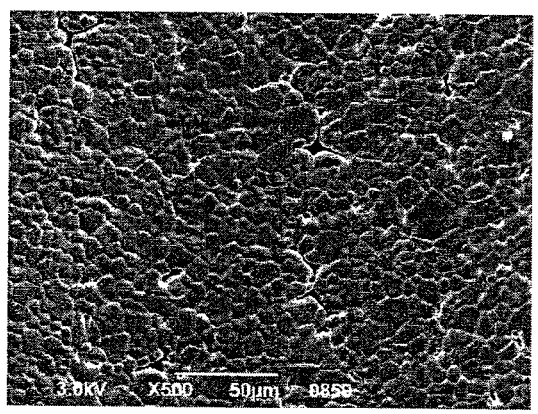
FIG. 2(b) illustrates a state of an existing core in which cavities remain due to insufficient disintegration of a granulated powder.

A Mn—Zn ferrite core in the present application is mainly used in the form of a closed magnetic circuit with a small size represented by a toroidal core having an outer diameter of about 2 to 6 mm. In the case of such a small size, since there is a high probability of mold breakage in compaction, it is impossible to apply a high compaction pressure. Accordingly, when a section of a core that is a fired compact as illustrated in FIG. 1 is observed with a scanning electron microscope (SEM), there are cases where cavities due to insufficient disintegration of granulated powder remain as illustrated in FIG. 2(b).

When the core includes such cavities, the volume occupied by the magnetic material is small and hence magnetic fluxes concentrate in the magnetic material region and a magnetic flux density locally increases. Accordingly, the same phenomenon as an increase in a superposed magnetic field seemingly occurs in the magnetic material region and, as a result, the incremental permeability decreases.

To overcome such a problem, the inventors have performed thorough studies. As a result, the inventors have achieved the following findings.

The inventors have found that cavities in a core are represented by numerical variation of an increase in the specific surface of the core; and, when an ideal specific surface of the core is calculated from the size and form of the core on the assumption that the surface of the core is in an ideal state of complete flatness, and a ratio of the measured specific surface to the ideal specific surface is made less than a specific value, the core has a small number of cavities and a desirable incremental permeability.

The inventors have also found that, to make the measured specific surface/ideal specific surface be less than a specific value, it is necessary to make the compressive rupture strength of a granulated powder be 1.10 MPa or less in the production process of a Mn—Zn ferrite, the compressive rupture strength being measured by a procedure defined in JIS Z 8841 in which measurements of granules in terms of compressive rupture strength are defined.

The present invention is based on these findings.

Hereinafter, the present invention will be specifically described.

The reasons why the composition of the basic component of a Mn—Zn ferrite core according to the present invention is limited to the above-described ranges will be described.
Iron Oxide (in Terms of $Fe_2O_3$): 51.0 to 54.5 Mol %

When iron oxide in the basic component is less than 51.0 mol % or is more than 54.5 mol %, the incremental permeability μΔ under the application of a direct-current magnetic field decreases in a low-temperature range and a high-temperature range. Accordingly, the content of iron oxide in terms of $Fe_2O_3$ is made in the range of 51.0 to 54.5 mol %, preferably in the range of 52.0 to 54.0 mol %.

Zinc Oxide (in Terms of ZnO): 8.0 to 12.0 Mol %

When the content of zinc oxide is less than 8.0 mol %, a sufficiently high incremental permeability µΔ is not achieved under the application of a direct-current magnetic field. When the content of zinc oxide is more than 12.0 mol %, in a low-temperature range, the incremental permeability µΔ under the application of a direct-current magnetic field decreases; and, in a high-temperature range, the Curie temperature at which a ferromagnetic material loses its magnetism decreases and the incremental permeability µΔ under the application of a direct-current magnetic field also decreases. Accordingly, the content of zinc oxide in terms of ZnO is made in the range of 8.0 to 12.0 mol %, preferably in the range of 9.0 to 11.0 mol %.

Manganese Oxide (in Terms of MnO): Balance

The present invention relates to a Mn—Zn ferrite and the balance in the composition of the basic component needs to be manganese oxide. This is because, by making the ferrite contain manganese oxide, a high incremental permeability µΔ of 400 or more cannot be achieved under the application of a direct-current magnetic field of 80 A/m. The preferred range of manganese oxide in terms of MnO is 34.5 to 40.0 mol %.

The contents of iron oxide, zinc oxide, and manganese oxide that constitute the basic component are adjusted such that the total amount of iron oxide in terms of $Fe_2O_3$, zinc oxide in terms of ZnO, and manganese oxide in terms of MnO is 100 mol %.

The reasons why the composition of the sub-components of a Mn—Zn ferrite core according to the present invention is limited to the above-described ranges will be described.

Silicon Oxide (in Terms of $SiO_2$): 50 to 400 Mass Ppm

Silicon oxide has an effect of reducing the number of vacancies remaining in crystal grains to thereby increase the incremental permeability µΔ under the application of a direct-current magnetic field. However, when the content of silicon oxide is less than 50 mass ppm, the effect of adding silicon oxide is not sufficiently exhibited; and when the content of silicon oxide is more than 400 mass ppm, exaggerated grains appear and the incremental permeability µΔ considerably decreases under the application of a direct-current magnetic field. Accordingly, the content of silicon oxide in terms of $SiO_2$ is made in the range of 50 to 400 mass ppm, preferably in the range of 100 to 250 mass ppm.

Calcium Oxide (in Terms of CaO): 50 to 4000 Mass Ppm

Calcium oxide segregates in crystal grain boundaries of a Mn—Zn ferrite to provide an effect of suppressing growth of crystal grains. As a result, the initial permeability is appropriately decreased and the incremental permeability µΔ under the application of a direct-current magnetic field is effectively increased. However, when the content of calcium oxide is less than 50 mass ppm, the effect of suppressing growth of grains is not sufficiently provided; and when the content of calcium oxide is more than 4000 mass ppm, exaggerated grains appear and the incremental permeability µΔ considerably decreases under the application of a direct-current magnetic field. Accordingly, the content of calcium oxide in terms of CaO is made in the range of 50 to 4000 mass ppm, preferably in the range of 250 to 2500 mass ppm.

Note that the initial permeability $\mu_i$ at 23° C. is preferably made about 2500 to 4500.

In the present invention, to increase the incremental permeability µΔ under the application of a direct-current magnetic field, it is important to limit the contents of impurities in a ferrite, in particular, phosphorus, boron, sulfur, and chlorine simultaneously to ranges below.

Phosphorus: Less than 3 Mass Ppm, Boron: Less than 3 Mass Ppm

Phosphorus and boron are unavoidable impurities derived from raw material iron oxide. When the content of phosphorus or boron is 3 mass ppm or more, exaggerated grain growth is induced and the incremental permeability µΔ considerably decreases under the superposition of a high magnetic field of 80 A/m. Accordingly, the contents of phosphorus and boron are limited to less than 3 mass ppm.

The contents of phosphorus and boron can be limited to less than 3 mass ppm by, for example, a method of using raw material powders of iron oxide, zinc oxide, and manganese oxide that have a high purity and contain phosphorus and boron as less as possible. In addition, the contents of phosphorus and boron in a medium used in mixing and pulverization such as a ball mill or an attritor are preferably low to avoid entry of phosphorus and boron due to abrasion of the medium.

Note that all the values defined herein are quantified by an analytical procedure defined in "Molybdophosphate extraction-separation/molybdophosphoric blue spectrophotometric method" in JIS G 1214 (1998) in terms of the P component and by a procedure defined in "Curcumin spectrophotometric method" in JIS G 1227 (1999) in terms of the B component.

Sulfur: Less than 5 Mass Ppm

Sulfur is an unavoidable impurity derived from raw material iron oxide obtained from ferrous sulfide. When the content of sulfur is 5 mass ppm or more, exaggerated grain growth is induced and the incremental permeability considerably decreases under the superposition of a high magnetic field of 80 A/m. Accordingly, the content of sulfur is limited to less than 5 mass ppm. The content of sulfur is preferably limited to less than 4 mass ppm.

The content of sulfur can be limited to less than 5 mass ppm by, for example, a method in which time for calcination performed at 800° C. or more in the air atmosphere in the production of a Mn—Zn ferrite is increased to allow reaction between sulfur and oxygen to sufficiently proceed to thereby reduce the content of sulfur.

Note that the S values defined herein are quantified by an analytical procedure for the S component defined in "Methylene blue spectrophotometric method after separation of hydrosulfide" in JIS G 1215 (1994).

Chlorine: Less than 10 Mass Ppm

Chlorine is an unavoidable impurity derived from raw material iron oxide obtained from iron chloride. When the content of chlorine is 10 mass ppm or more, exaggerated grain growth is induced and the incremental permeability µΔ considerably decreases under the application of a direct-current magnetic field of 80 A/m. Accordingly, the content of chlorine is limited to less than 10 mass ppm. The content of chlorine is preferably limited to less than 8 mass ppm.

The content of chlorine can be limited to less than 10 mass ppm by, for example, a method in which raw material iron oxide is sufficiently washed with pure water in the production of a Mn—Zn ferrite to dissolve chlorine highly ionizable in pure water to thereby reduce the content of chlorine.

Note that the Cl values defined herein are quantified by an analytical procedure for the Cl component: "nitric acid decomposition-iron chloride nephelometry".

The content of each unavoidable impurity other than the above-described phosphorus, boron, sulfur, and chlorine is not particularly limited, but is preferably reduced to 50 mass ppm or less.

The basic component, the sub-components, and the reduced components of a Mn—Zn ferrite core according to the present invention have been described so far. In the present invention, the limitation of the component composition of such a core to the above-described ranges only is insufficient and a formula below in terms of surface area needs to be satisfied.

It is important to satisfy the relationship represented by the following formula (I) in terms of the surface area of the core.

Measured specific surface/ideal specific surface<1500  (1)

The measured specific surface is a value determined by a BET method (multipoint method) in JIS Z 8830 (2001) and the unit thereof is m$^2$/g. The ideal specific surface is a value obtained by, on the basis of the size and mass of the ferrite core, dividing the surface area of the core calculated on the assumption that the core is in an ideal state of having no cavities, by the mass of the core; and the unit thereof is also m$^2$/g.

Figure 3:
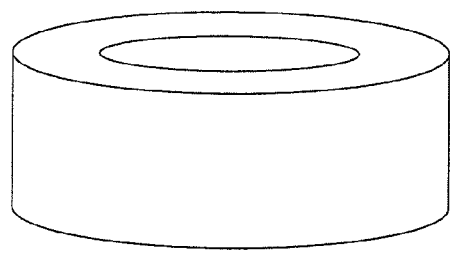
FIG. 3 illustrates the way of calculating an ideal specific surface.

For reference, the way of calculating the ideal specific surface is illustrated in FIG. 3.

When the assumption is made that the core surface is in an ideal state of complete flatness, the specific surface can be calculated with the following formula.

Ideal specific surface=[2×{(outer diameter)$^2$−(inner diameter)$^2$}/4×π+{(outer diameter)+(inner diameter)}×π×height]/core mass When a ferrite core includes a large number of cavities, which results in a problem of a decrease in the incremental permeability, a large number of cavities also remain in the surface of the core and hence the measured specific surface is large. Thus, the ratio of measured specific surface/ideal specific surface is high. Thorough studies have been performed on the ratio of measured specific surface/ideal specific surface. As a result, it has been revealed that, when the ratio can be reduced to less than 1500, it can be regarded that a core is obtained in which the incremental permeability does not decrease, that is, a dense core is obtained in which the number of cavities remaining in the surface of the core is small. The ratio of (measured specific surface/ideal specific surface) is preferably 1150 or less.

To reduce the ratio of measured specific surface/ideal specific surface to less than 1500, it is important to optimize granulation conditions in the production process of a Mn—Zn ferrite to provide a soft granulated powder. The production process of a Mn—Zn ferrite is a known technique in which, as the granulation method, a spray drying method is mainly employed, which is described in detail in documents, for example, p. 52 in "Ferrite" (Hiraga, Okutani, and Oshima; Maruzen: 1986):

The hardness of a granulated powder can be represented in a numerical value by the measurement of the compressive rupture strength of a granulated powder defined in JIS Z 8841 (1993). It has been revealed that, when the compressive rupture strength is 1.10 MPa or less, the ratio of measured specific surface/ideal specific surface can be reduced to less than 1500. The compressive rupture strength is preferably 1.00 MPa or less.

Since Mn—Zn ferrite has a low resistivity of less than 10$^2$ Ωm, it is often used after a surface thereof is subjected to an insulation coating treatment. However, the measured specific surface defined in the present invention is a measured value of a core that is not subjected to the coating treatment. This is because the coating treatment makes the surface be smooth and hence it becomes impossible to accurately measure the specific surface of a Mn—Zn ferrite.

A Mn—Zn ferrite according to the present invention may contain, in addition to the above-described components, other components described below as additional sub-components appropriately.

Cobalt Oxide (in Terms of CoO): 50 to 3000 Mass Ppm

By making an appropriate amount of cobalt oxide having positive magnetic anisotropy be contained, the incremental permeability μΔ under the application of a direct-current magnetic field can be increased in a wide temperature range of 0° C. to 85° C. However, when the content of cobalt oxide is less than 50 mass ppm, such an effect of adding cobalt oxide is not sufficiently provided. When the content of cobalt oxide is more than 3000 mass ppm, the incremental permeability μΔ under the application of a direct-current magnetic field decreases in the entire temperature range. Accordingly, the content of cobalt oxide in terms of CoO is made in the range of 50 to 3000 mass ppm.

One or more selected from zirconium oxide (in terms of $ZrO_2$): 0.005 to 0.075 mass %; tantalum oxide (in terms of $Ta_2O_5$): 0.005 to 0.075 mass %; hafnium oxide (in terms of $HfO_2$): 0.005 to 0.075 mass %; and niobium oxide (in terms of $Nb_2O_5$): 0.005 to 0.075 mass %

All these components are compounds having a high melting point and, in a Mn—Zn ferrite, decrease the size of crystal grains. Thus, the components suppress generation of coarse crystal grains and increase the incremental permeability μΔ under the application of a direct-current magnetic field. Such an effect is not sufficiently provided when the content of such a component is too low. When the content of such a component is too high, exaggerated grain growth is caused and the incremental permeability μΔ decreases under the application of a direct-current magnetic field. Accordingly, the components are made to be contained in the above-described ranges.

Note that addition of an additive in this group together with cobalt oxide can result in a considerable increase in the incremental permeability μΔ under the application of a magnetic field of 80 A/m. The reason for this is not clearly understood; however, a compound that increases the incremental permeability μΔ is probably generated upon the addition of cobalt oxide and zirconium oxide, tantalum oxide, hafnium oxide, or niobium oxide.

Next, a preferred method for producing a Mn—Zn ferrite according to the present invention will be described.

The powders of iron oxide, zinc oxide, and manganese oxide that constitute the basic component are weighed so as to achieve predetermined percentages. The powders are sufficiently mixed and then calcined. The calcined powder is then pulverized. The sub-components are added to the calcined powder so as to achieve predetermined proportions and are pulverized together with the calcined powder. In this process, the powder needs to be made sufficiently uniform such that concentrations of the added components are not localized and the particle size of the calcined powder needs to be decreased to a target average size. The resultant powder is mixed with an organic binder such as polyvinyl alcohol and granulated by a spray drying method or the like into a soft granulated powder having a compressive rupture strength of less than 1.10 MPa. The granulated powder is then compacted into a desired form and subsequently fired under appropriate firing conditions. The pressure applied in the compaction is preferably about 115 to 120 MPa. The firing conditions are preferably a temperature of 1200 to 1400° C. and a time for about 18 to 30 hours.

The compressive rupture strength of the granulated powder can be effectively reduced to less than 1.10 MPa by decreasing the temperature in granulation: specifically, to about 150 to 200° C., which is about 50 to 100° C. lower than the conventional temperature of 250 to 300° C.

When granulation is performed at the conventional temperature of 250 to 300° C., the granulated powder has a compressive rupture strength of about 1.2 to 1.4 MPa. As described above, a target condition of the present invention Measured specific surface/ideal specific surface<1500    (1)

cannot be satisfied with such a compressive rupture strength.

The thus-obtained Mn—Zn ferrite can have, under the application of a high direct-current magnetic field of 80 A/m, a high incremental permeability μΔ of 400 or more in a temperature range of 0 to 85° C. and a high incremental permeability μΔ of 700 or more at 65° C., which cannot be achieved in existing Mn—Zn ferrites.

EXAMPLE 1

Raw material powders were weighed such that the compositions of iron oxide, zinc oxide, and manganese oxide that constituted the basic component satisfied percentages in Table 1 in terms of $Fe_2O_3$, ZnO, and MnO. The raw material powders were mixed with a ball mill for 16 hours and then calcined in the air at 925° C. for 3 hours. The calcined powders were then mixed with, as sub-components, silicon oxide and calcium oxide having been respectively weighed so as to achieve proportions in Table 1 in terms of $SiO_2$ and CaO, and pulverized with the ball mill for 12 hours. The resultant powder mixtures were mixed with polyvinyl alcohol, granulated at 180° C., and compacted into toroidal cores under the application of a pressure of 118 MPa. The compacts were then put into a kiln and fired at a maximum temperature of 1350° C. Thus, sintered cores having an outer diameter of 6.0 mm, an inner diameter of 3.0 mm, and a height of 4.0 mm were obtained.

A wire was wound ten turns around each specimen obtained in this way. While the core was under the application of a direct-current magnetic field of 80 A/m with a direct-current application apparatus (42841A, manufactured by Agilent Technologies, Inc.), the specimen was measured in terms of incremental permeability μΔ at 0° C., 23° C., 65° C., and 85° C. at a measurement voltage of 100 mV and at a measurement frequency of 100 kHz with a LCR meter (4284A, manufactured by Agilent Technologies, Inc.). Note that the initial permeability $\mu_i$ was measured at 23° C. with the LCR meter (4284A).

In the preparation of the specimens, all the raw materials including iron oxide were highly pure; the ball mill serving as the mixing and pulverization medium had low contents of phosphorus and boron; the calcination was performed under sufficient air flow; and pure water used scarcely contained Cl. As a result, in all the specimens, the final contents of P, B, S, and Cl were respectively 2 mass ppm, 2 mass ppm, 3 mass ppm, and 6 mass ppm.

The compressive rupture strength of the granulated powders measured in accordance with JIS Z 8841 was 0.90±0.05 MPa and hence the number of cavities remaining in the surfaces of the ferrite cores was small. Accordingly, the measured specific surface was 0.453 to 0.493 $m^2/g$ and the ideal specific surface was $4.44 \times 10^{-4}$ $m^2/g$. All the ratios of (measured specific surface/ideal specific surface) were 1020 to 1110, which were less than 1500.

As for the crystal grain size of each specimen, the core was cut; the fracture section was polished; micrographs of three different fields of view of the polished surface at 500× magnification were taken with an optical microscope; size of grains in the micrographs was measured; and the average crystal grain size was calculated from the measured grain size.

The results are also described in Table 1.

TABLE 1

| Specimen No. | Basic component (mol %) | | | Sub-components (mass ppm) | | Initial permeability $\mu_i$ | Incremental permeability under application of magnetic field of 80 A/m (μΔ) | | | | Average crystal grain size | Compressive rupture strength of granulated powder | Measured specific surface/ ideal specific surface | Remarks |
|---|---|---|---|---|---|---|---|---|---|---|---|---|---|---|
| | $Fe_2O_3$ | ZnO | MnO | $SiO_2$ | CaO | 23° C. | 0° C. | 23° C. | 65° C. | 85° C. | (μm) | (MPa) | | |
| 1-1 | 55.0 | 10.0 | Balance | 100 | 500 | 3100 | 360 | 440 | 590 | 350 | 8 | 0.90 ± 0.05 | 1020-1110 | Comparative example |
| 1-2 | 50.5 | 10.0 | Balance | 100 | 500 | 3500 | 370 | 480 | 610 | 340 | 8 | | | Comparative example |
| 1-3 | 53.4 | 10.5 | Balance | 100 | 500 | 3700 | 420 | 540 | 770 | 660 | 8 | | | Example of invention |
| 1-4 | 52.0 | 10.0 | Balance | 100 | 500 | 4000 | 430 | 560 | 750 | 640 | 8 | | | Example of invention |
| 1-5 | 52.0 | 12.5 | Balance | 100 | 500 | 4600 | 450 | 570 | 560 | 360 | 8 | | | Comparative example |
| 1-6 | 52.0 | 7.5 | Balance | 100 | 500 | 3000 | 320 | 410 | 590 | 380 | 8 | | | Comparative example |
| 1-7 | 51.8 | 10.0 | Balance | 100 | 500 | 4200 | 430 | 570 | 740 | 610 | 8 | | | Example of invention |
| 1-8 | 52.0 | 10.0 | Balance | 20 | 500 | 5200 | 330 | 410 | 570 | 380 | 19 | | | Comparative example |
| 1-9 | 52.0 | 10.0 | Balance | 100 | 35 | 5600 | 320 | 400 | 560 | 370 | 25 | | | Comparative example |
| 1-10 | 52.0 | 10.0 | Balance | 250 | 2500 | 2800 | 420 | 530 | 780 | 680 | 7 | | | Example of invention |
| 1-11 | 52.0 | 10.0 | Balance | 450 | 500 | 2200 | 210 | 260 | 360 | 200 | 190 | | | Comparative example |
| 1-12 | 52.0 | 10.0 | Balance | 100 | 4500 | 1900 | 180 | 230 | 290 | 160 | 171 | | | Comparative example |
| 1-13 | 52.0 | 10.0 | Balance | 450 | 4500 | 1700 | 90 | 130 | 150 | 70 | 253 | | | Comparative example |

As described in Table 1, Specimen Nos. 1-3, 1-4, 1-7, and 1-10 serving as examples of the invention had excellent characteristics in which, under the application of a direct-current magnetic field of 80 A/m, the incremental permeability μΔ was continuously 400 or more in a wide temperature range of 0 to 85° C. and the incremental permeability μΔ at 65° C. was 700 or more.

In contrast, in a comparative example (Specimen No. 1-1) in which the content of $Fe_2O_3$ was more than 54.5 mol % and a comparative example (Specimen No. 1-2) in which the content of $Fe_2O_3$ was less than 51.0 mol %, under the application of a direct-current magnetic field of 80 A/m, the incremental permeability μΔ was less than 400 at 0° C. and 85° C. and the incremental permeability μΔ at 65° C. was less than 700.

In a comparative example (Specimen No. 1-5) in which the content of ZnO was high and more than the upper limit, under the application of a direct-current magnetic field of 80 A/m, the incremental permeability μΔ at 85° C. was less than 400 and the incremental permeability μΔ at 65° C. decreased to less than 700. In a comparative example (Specimen No. 1-6) in which the content of ZnO was less than the lower limit, under the application of a direct-current magnetic field of 80 A/m, the incremental permeability μΔ decreased in the entire temperature range, the incremental permeability μΔ at 0° C. and 85° C. was less than 400 and the incremental permeability μΔ at 65° C. was less than 700.

As for $SiO_2$ and CaO, in comparative examples (Specimen Nos. 1-8 and 1-9) in which the content of $SiO_2$ or CaO is less than the appropriate ranges, the initial permeability μΔ excessively increased and, as a result, the incremental permeability μΔ decreased in the entire temperature range, compared with the examples of the invention: under the application of a direct-current magnetic field of 80 A/m, the incremental permeability μΔ at 0° C. and 85° C. was less than 400 and the incremental permeability μΔ, at 65° C. was less than 700. In contrast, in comparative examples (Specimen Nos. 1-11, 1-12, and 1-13) in which the content of $SiO_2$ and/or CaO was more than the appropriate ranges, exaggerated grains appeared and, as a result, the incremental permeability μΔ considerably decreased in the entire temperature range under the application of a direct-current magnetic field of 80 A/m.

EXAMPLE 2

Several iron oxide raw materials having different contents in terms of P, B, S, and Cl were used. The raw materials were weighed on the basis of calculation for achieving the contents of P, B, S, and Cl in Tables 2-1 and 2-2 such that the composition of iron oxide (in terms of $Fe_2O_3$), zinc oxide (in terms of ZnO), and manganese oxide (in terms of MnO) that constituted the basic component respectively satisfied $Fe_2O_3$: 52.0 mol %, ZnO: 10.0 mol %, and MnO: the balance. The raw materials were mixed with a ball mill for 16 hours and then calcined in the air at 925° C. for 3 hours. Some of the calcined powders were then mixed with, as sub-components, silicon oxide (100 mass ppm in terms of $SiO_2$) and calcium oxide (500 mass ppm in terms of CaO). All the raw material powders were then pulverized with the ball mill for 12 hours. The resultant powder mixtures were mixed with polyvinyl alcohol, granulated, and compacted into toroidal cores under the application of a pressure of 118 MPa. At this time, the granulation temperature was varied such that the resultant granulated powders had various compressive rupture strengths. The compacts were then put into a kiln and fired at a maximum temperature of 1350° C. Thus, sintered cores having an outer diameter of 6.0 mm, an inner diameter of 3.0 mm, and a height of 4.0 mm were obtained.

A wire was wound ten turns around each specimen obtained in this way. The specimen was measured in terms of incremental permeability μΔ at 0° C., 23° C., 65° C., and 85° C. at a measurement voltage of 100 mV and at a measurement frequency of 100 kHz under the application of a direct-current magnetic field of 80 A/m with the same direct-current application apparatus and LCR meter as in EXAMPLE. The compressive rupture strength of the granulated powders was measured in accordance with requirements of JIS Z 8841. The measured specific surface was also measured by a BET method (multipoint method) in JIS Z 8830 (2001). The ideal specific surface was calculated from size and weight that were measured in accordance with JIS C 2560. The ratio of (measured specific surface/ideal specific surface) was calculated from the ideal specific surface of $4.44 \times 10^{-4}$ $m^2/g$). The initial permeability $\mu_i$ and the average crystal grain size were measured as in EXAMPLE 1.

The results are also described in Tables 2-1 and 2-2.

TABLE 2-1

| Specimen No. | Sub-component (mass %) | | Contents of impurities (mass ppm) | | | | Initial permeability $\mu_i$ | Incremental permeability under application of magnetic field of 80 A/m (μΔ) | | | |
|---|---|---|---|---|---|---|---|---|---|---|---|
| | $ZrO_2$ | CoO | P | B | S | Cl | 23° C. | 0° C. | 23° C. | 65° C. | 85° C. |
| 1-4 | 0 | 0 | 2 | 2 | 3 | 6 | 4000 | 430 | 560 | 750 | 640 |
| 2-1 | | | 2 | 2 | 4 | 8 | 3700 | 410 | 530 | 720 | 610 |
| 2-2 | | | 5 | 2 | 3 | 6 | 3000 | 300 | 380 | 520 | 300 |
| 2-3 | | | 2 | 5 | 3 | 6 | 2900 | 310 | 380 | 520 | 300 |
| 2-4 | | | 2 | 2 | 8 | 6 | 3000 | 230 | 310 | 480 | 200 |
| 2-5 | | | 2 | 2 | 3 | 15 | 3000 | 210 | 300 | 450 | 210 |
| 2-6 | | | 5 | 5 | 3 | 6 | 2700 | 170 | 260 | 310 | 160 |
| 2-7 | | | 2 | 2 | 8 | 15 | 2700 | 160 | 240 | 280 | 160 |
| 2-8 | | | 5 | 2 | 8 | 15 | 1600 | 160 | 240 | 300 | 150 |
| 2-9 | | | 5 | 5 | 3 | 15 | 1200 | 130 | 190 | 260 | 120 |
| 2-10 | | | 5 | 5 | 8 | 6 | 1200 | 130 | 180 | 250 | 110 |
| 2-11 | | | 5 | 5 | 8 | 15 | 800 | 110 | 160 | 230 | 100 |
| 2-12 | | | 10 | 10 | 15 | 30 | 700 | 60 | 100 | 130 | 40 |
| 2-13 | 0.050 | 0 | 5 | 2 | 3 | 6 | 2200 | 280 | 350 | 470 | 280 |
| 2-14 | 0 | 0.100 | 5 | 2 | 3 | 6 | 2200 | 290 | 360 | 480 | 290 |
| 2-15 | 0.050 | 0.100 | 2 | 5 | 3 | 6 | 1900 | 320 | 380 | 490 | 290 |
| 2-16 | 0 | 0.100 | 2 | 5 | 3 | 6 | 2000 | 310 | 370 | 490 | 290 |
| 2-17 | 0.050 | 0 | 2 | 2 | 8 | 6 | 2100 | 220 | 280 | 450 | 200 |
| 2-18 | 0 | 0.100 | 2 | 2 | 8 | 6 | 2100 | 230 | 290 | 460 | 210 |
| 2-19 | 0.050 | 0.100 | 2 | 2 | 3 | 15 | 2000 | 230 | 300 | 440 | 220 |
| 2-20 | 0 | 0.100 | 2 | 2 | 3 | 15 | 2100 | 220 | 290 | 430 | 210 |

TABLE 2-1-continued

| Specimen No. | Average crystal grain size (μm) | Compressive rupture strength of granulated powder (MPa) | Measured specific surface (m²/g) | Measured specific surface/ ideal specific surface | Remarks |
|---|---|---|---|---|---|
| 1-4 | 8 | 0.90 ± 0.05 | 0.448-0.493 | 1020-1110 | Example of invention |
| 2-1 | 10 | | | | Example of invention |
| 2-2 | 19 | | | | Comparative example |
| 2-3 | 27 | | | | Comparative example |
| 2-4 | 22 | | | | Comparative example |
| 2-5 | 21 | | | | Comparative example |
| 2-6 | 36 | | | | Comparative example |
| 2-7 | 39 | | | | Comparative example |
| 2-8 | 48 | | | | Comparative example |
| 2-9 | 56 | | | | Comparative example |
| 2-10 | 66 | | | | Comparative example |
| 2-11 | 193 | | | | Comparative example |
| 2-12 | 226 | | | | Comparative example |
| 2-13 | 17 | 1.25 ± 0.05 | 0.730-0.808 | 1640-1800 | Comparative example |
| 2-14 | 17 | | | | Comparative example |
| 2-15 | 24 | | | | Comparative example |
| 2-16 | 25 | | | | Comparative example |
| 2-17 | 20 | | | | Comparative example |
| 2-18 | 20 | | | | Comparative example |
| 2-19 | 18 | | | | Comparative example |
| 2-20 | 19 | | | | Comparative example |

TABLE 2-2

| Specimen No. | Sub-component (mass %) | | Contents of impurities (mass ppm) | | | | Initial permeability $\mu_i$ | Incremental permeability under application of magnetic field of 80 A/m (μΔ) | | | |
|---|---|---|---|---|---|---|---|---|---|---|---|
| | ZrO₂ | CoO | P | B | S | Cl | 23° C. | 0° C. | 23° C. | 65° C. | 85° C. |
| 2-21 | 0.050 | 0.100 | 5 | 2 | 3 | 6 | 2600 | 330 | 410 | 540 | 340 |
| 2-22 | 0 | 0.100 | 5 | 2 | 3 | 6 | 2800 | 320 | 400 | 530 | 330 |
| 2-23 | 0.050 | 0 | 2 | 5 | 3 | 6 | 2700 | 330 | 400 | 530 | 330 |
| 2-24 | 0 | 0.100 | 2 | 5 | 3 | 6 | 2600 | 340 | 410 | 540 | 320 |
| 2-25 | 0.050 | 0.100 | 2 | 2 | 8 | 6 | 2700 | 260 | 340 | 510 | 230 |
| 2-26 | 0 | 0.100 | 2 | 2 | 8 | 6 | 2800 | 260 | 330 | 500 | 220 |
| 2-27 | 0.050 | 0 | 2 | 2 | 3 | 15 | 2800 | 230 | 320 | 470 | 230 |
| 2-28 | 0 | 0.100 | 2 | 2 | 3 | 15 | 2800 | 240 | 330 | 480 | 240 |
| 2-29 | 0 | 0 | 5 | 2 | 3 | 6 | 2400 | 210 | 270 | 380 | 200 |
| 2-30 | | | 2 | 5 | 3 | 6 | 2200 | 200 | 260 | 360 | 190 |
| 2-31 | | | 2 | 2 | 8 | 6 | 2300 | 220 | 280 | 380 | 220 |
| 2-32 | | | 2 | 2 | 3 | 15 | 2300 | 230 | 280 | 380 | 220 |
| 2-33 | | | 5 | 5 | 3 | 6 | 1900 | 170 | 230 | 350 | 150 |
| 2-34 | | | 2 | 2 | 8 | 15 | 2000 | 160 | 220 | 330 | 160 |
| 2-35 | | | 5 | 2 | 8 | 15 | 1200 | 130 | 190 | 230 | 120 |
| 2-36 | | | 5 | 5 | 3 | 15 | 900 | 120 | 180 | 210 | 120 |
| 2-37 | | | 5 | 5 | 8 | 6 | 900 | 120 | 180 | 220 | 110 |
| 2-38 | | | 5 | 5 | 8 | 15 | 700 | 100 | 140 | 190 | 90 |
| 2-39 | | | 10 | 10 | 15 | 30 | 600 | 40 | 70 | 100 | 30 |

| Specimen No. | Average crystal grain size (μm) | Compressive rupture strength of granulated powder (MPa) | Measured specific surface (m²/g) | Measured specific surface/ ideal specific surface | Remarks |
|---|---|---|---|---|---|
| 2-21 | 17 | 0.90 ± 0.05 | 0.448-0.493 | 1020-1110 | Comparative example |
| 2-22 | 18 | | | | Comparative example |
| 2-23 | 26 | | | | Comparative example |
| 2-24 | 26 | | | | Comparative example |
| 2-25 | 20 | | | | Comparative example |
| 2-26 | 21 | | | | Comparative example |
| 2-27 | 20 | | | | Comparative example |
| 2-28 | 20 | | | | Comparative example |
| 2-29 | 22 | 1.25 ± 0.05 | 0.730-0.808 | 1640-1800 | Comparative example |
| 2-30 | 25 | | | | Comparative example |
| 2-31 | 21 | | | | Comparative example |

TABLE 2-2-continued

| | | |
|---|---|---|
| 2-32 | 23 | Comparative example |
| 2-33 | 39 | Comparative example |
| 2-34 | 42 | Comparative example |
| 2-35 | 52 | Comparative example |
| 2-36 | 59 | Comparative example |
| 2-37 | 64 | Comparative example |
| 2-38 | 178 | Comparative example |
| 2-39 | 213 | Comparative example |

As described in Tables 2-1 and 2-2, examples of the invention (Specimen Nos. 1-4 and 2-1) in which the content of S was less than 5 mass ppm, the content of Cl was less than 10 mass ppm, and the contents of P and B were less than 3 mass ppm, had excellent characteristics in which, under the application of a direct-current magnetic field of 80 A/m, the incre- 8841. The measured specific surface was also measured by a BET method (multipoint method) in JIS Z 8830 (2001) and the ratio of (measured specific surface/ideal specific surface) was determined. The initial permeability $\mu_i$ and the average crystal grain size were measured as in EXAMPLE 1.

The results are described in Table 3.

TABLE 3

| Specimen No. | Granulation temperature (°C.) | Compressive rupture strength of granulated powder (MPa) | Measured specific surface (m²/g) | Measured specific surface/ ideal specific surface | Initial permeability $\mu_i$ 23° C. | Incremental permeability under application of magnetic field of 80 A/m ($\mu_\Delta$) | | | | Average crystal grain size (μm) | Remarks |
|---|---|---|---|---|---|---|---|---|---|---|---|
| | | | | | | 0° C. | 23° C. | 65° C. | 85° C. | | |
| 3-1 | 150 | 0.70 | 0.426 | 960 | 4200 | 440 | 570 | 770 | 670 | 9 | Example of invention |
| 3-2 | 170 | 0.80 | 0.444 | 1000 | 4100 | 440 | 570 | 770 | 660 | 9 | Example of invention |
| 3-3 | 190 | 1.03 | 0.559 | 1260 | 3900 | 420 | 530 | 720 | 610 | 8 | Example of invention |
| 3-4 | 200 | 1.08 | 0.635 | 1430 | 3700 | 400 | 520 | 710 | 590 | 8 | Example of invention |
| 3-5 | 220 | 1.14 | 0.684 | <u>1540</u> | 3600 | <u>380</u> | 440 | <u>650</u> | 470 | 8 | Comparative example |
| 3-6 | 250 | 1.25 | 0.768 | <u>1730</u> | 3200 | <u>330</u> | 410 | <u>550</u> | 410 | 8 | Comparative example |
| 3-7 | 290 | 1.40 | 0.875 | <u>1970</u> | 2900 | <u>300</u> | <u>350</u> | <u>450</u> | <u>370</u> | 8 | Comparative example | mental permeability $\mu\Delta$ was 400 or more in a temperature range of 0 to 85° C. and the incremental permeability $\mu\Delta$ at 65° C. was 700 or more.

In contrast, in all the comparative examples (Specimen Nos. 2-2 to 2-39) in which the content of at least one of P, B, S, and Cl was more than the appropriate ranges, under the application of a direct-current magnetic field of 80 A/m, the incremental permeability $\mu\Delta$ was less than 400 in the range of 0 to 85° C. and the incremental permeability $\mu\Delta$ at 65° C. was less than 700.

EXAMPLE 3

A pulverized powder having the same composition as in Specimen No. 1-4 was used as a raw material. By changing the temperature condition in granulation by a spray drying method, granulated powders having different compressive rupture strengths in the range of 0.70 to 1.40 MPa were obtained. The granulated powders were then compacted and fired under the same conditions as in EXAMPLE 1 to obtain sintered cores having an outer diameter of 6.0 mm, an inner diameter of 3.0 mm, and a height of 4.0 mm (ideal specific surface: 4.44×10⁻⁴ m²/g).

A wire was wound ten turns around each specimen obtained in this way. While the core was under the application of a direct-current magnetic field of 80 A/m, the specimen was measured in terms of incremental permeability $\mu\Delta$ at 0° C., 23° C., 65° C., and 85° C. at a measurement voltage of 100 mV and at a measurement frequency of 100 kHz with the same direct-current application apparatus and LCR meter as in EXAMPLE.

The compressive rupture strength of the granulated powders was measured in accordance with requirements of JIS Z Examples of the invention (Specimen Nos. 3-1 to 3-4) in which the granulated powders had a compressive rupture strength of less than 1.10 MPa and, as a result, the specific surfaces of the cores decreased and the ratios of measured specific surface/ideal specific surface were less than 1500, had excellent characteristics in which, under the application of a direct-current magnetic field of 80 A/m, the incremental permeability $\mu\Delta$ was 400 or more in a temperature range of 0 to 85° C. and the incremental permeability $\mu\Delta$ at 65° C. was 700 or more.

However, comparative examples (Specimen Nos. 3-5 to 3-7) in which the granulated powders had a compressive rupture strength of 1.10 MPa or more and the ratios of measured specific surface/ideal specific surface were 1500 or more, that is, a large number of cavities were contained due to insufficient disintegration of the granulated powders, did not achieve characteristics in which the incremental permeability $\mu\Delta$ is 400 or more in the temperature range of 0 to 85° C. and the incremental permeability $\mu\Delta$ at 65° C. is 700 or more.

EXAMPLE 4

A calcined powder having the same composition as in Specimen No. 1-4 (note that adjustment was performed so as to achieve P: 2 mass ppm, B: 2 mass ppm, S: 3 mass ppm and Cl: 6 mass ppm) was mixed with cobalt oxide as a subcomponent such that the final compositions satisfied proportions in Table 4, and pulverized with a ball mill for 12 hours. The pulverized powders were mixed with polyvinyl alcohol, granulated at 180° C., and compacted into toroidal cores under the application of a pressure of 118 MPa. The compacts were then put into a kiln and fired at a maximum temperature of 1350° C. Thus, sintered cores having an outer diameter of 6.0 mm, an inner diameter of 3.0 mm, and height of 4.0 mm (ideal specific surface: $4.44\times10^{-4}$ m$^2$/g) were obtained.

Each specimen obtained in this way was measured as in EXAMPLE 1 in terms of the incremental permeability μΔ at 0° C., 23° C., 65° C., and 85° C. under the application of a direct-current magnetic field of 80 A/m; the compressive rupture strength of the granulated powders; the ratio of (measured specific surface/ideal specific surface); the initial permeability $\mu_i$; and the average crystal grain size. The compressive rupture strength of the granulated powders was 0.90±0.05 MPa. The measured specific surface measured by a BET method (multipoint method) in JIS Z 8830 (2001) was in the range of 0.453 to 0.493 m$^2$/g. Thus, all the ratios of (measured specific surface/ideal specific surface) were in the range of 1020 to 1110, which were less than 1500.

The results are described in Table 4.

EXAMPLE 5

A calcined powder having the same composition as in Specimen No. 1-4 (note that adjustment was performed so as to achieve P: 2 mass ppm, B: 2 mass ppm, S: 3 mass ppm and Cl: 6 mass ppm) was mixed with zirconium oxide (in terms of ZrO$_2$), tantalum oxide (in terms of Ta$_2$O$_5$), hafnium oxide (in terms of HfO$_2$), and niobium oxide (in terms of Nb$_2$O$_5$) as sub-components such that the final compositions satisfied percentages in Table 5, and pulverized with a ball mill for 12 hours. The pulverized powders were mixed with polyvinyl alcohol, granulated at 180° C., and compacted into toroidal cores under the application of a pressure of 118 MPa. The compacts were then-put into a kiln and fired at a maximum temperature of 1350° C. Thus, sintered cores having an outer

TABLE 4

| Specimen No. | Amount of CoO added (mass ppm) | Initial permeability $\mu_i$ 23° C. | Incremental permeability under application of magnetic field of 80 A/m (μΔ) | | | | Average crystal grain size (μm) | Compressive rupture strength of granulated powder (MPa) | Measured specific surface/ ideal specific surface | Remarks |
|---|---|---|---|---|---|---|---|---|---|---|
| | | | 0° C. | 23° C. | 65° C. | 85° C. | | | | |
| 1-4 | 0 | 4000 | 430 | 560 | 750 | 640 | 8 | 0.90 ± 0.05 | 1020-1110 | Example of invention |
| 4-1 | 500 | 3800 | 530 | 670 | 870 | 710 | 7 | | | Example of invention |
| 4-2 | 1000 | 3500 | 550 | 690 | 890 | 680 | 7 | | | Example of invention |
| 4-3 | 2000 | 3000 | 570 | 700 | 890 | 640 | 7 | | | Example of invention |
| 4-4 | 2500 | 2700 | 590 | 720 | 870 | 590 | 7 | | | Example of invention |
| 4-5 | <u>3500</u> | 2300 | <u>250</u> | <u>370</u> | <u>440</u> | <u>370</u> | 14 | | | Comparative example |
| 4-6 | <u>5000</u> | 1800 | <u>210</u> | <u>310</u> | <u>390</u> | <u>320</u> | 17 | | | Comparative example |
| 4-7 | <u>10000</u> | 1500 | <u>80</u> | <u>100</u> | <u>170</u> | <u>140</u> | 26 | | | Comparative example |

As described in Table 4, all the examples of the invention (Specimen Nos. 4-1 to 4-4) in which appropriate amounts of CoO having positive magnetic anisotropy were added had excellent values: under the application of a direct-current magnetic field of 80 A/m, the incremental permeability μΔ was continuously 500 or more in a temperature range of 0 to 85° C. and the μΔ at 65° C. was 850 or more. Thus, these examples had characteristic values equivalent to or better than those of the example of the invention (Specimen No. 1-4) having a composition without CoO.

However, in all the comparative examples (Specimen Nos. 4-5 to 4-7) in which CoO was added in large amounts more than the upper limit, the incremental permeability μΔ under the application of a direct-current magnetic field of 80 A/m considerably decreased in the entire temperature range.

diameter of 6.0 mm, an inner diameter of 3.0 mm, and a height of 4.0 mm (ideal specific surface: $4.44\times10^{-4}$ m$^2$/g) were obtained.

Each specimen obtained in this way was measured as in EXAMPLE 1 in terms of the incremental permeability μΔ at 0° C., 23° C., 65° C., and 85° C. under the application of a direct-current magnetic field of 80 A/m; the compressive rupture strength of the granulated powders; the ratio of (measured specific surface/ideal specific surface); the initial permeability $\mu_i$; and the average crystal grain size. The compressive rupture strength of the granulated powders was 0.90±0.05 MPa. The measured specific surface measured by a BET method (multipoint method) in JIS Z 8830 (2001) was in the range of 0.453 to 0.493 m$^2$/g. Thus, all the ratios of (measured specific surface/ideal, specific surface) were in the range of 1020 to 1110, which were less than 1500.

The results are described in Table 5.

TABLE 5

| Specimen No. | Sub-components (mass %) | | | | Initial permeability $\mu_i$ | Incremental permeability under application of magnetic field of 80 A/m ($\mu\Delta$) | | | | Average crystal grain size | Compressive rupture strength of granulated powder | Measured specific surface/ ideal specific surface | Remarks |
|---|---|---|---|---|---|---|---|---|---|---|---|---|---|
| | $ZrO_2$ | $Ta_2O_5$ | $HfO_2$ | $Nb_2O_5$ | 23° C. | 0° C. | 23° C. | 65° C. | 85° C. | (μm) | (MPa) | | |
| 1-4 | 0 | 0 | 0 | 0 | 4000 | 430 | 560 | 750 | 640 | 8 | 0.90 ± 0.05 | 1020-1110 | Example of invention |
| 5-1 | 0.050 | 0 | 0 | 0 | 3800 | 460 | 580 | 810 | 680 | 7 | | | Example of invention |
| 5-2 | 0 | 0.050 | 0 | 0 | 3800 | 460 | 580 | 820 | 680 | 7 | | | Example of invention |
| 5-3 | 0 | 0 | 0.050 | 0 | 3800 | 460 | 580 | 810 | 670 | 7 | | | Example of invention |
| 5-4 | 0 | 0 | 0 | 0.050 | 3800 | 460 | 590 | 830 | 680 | 7 | | | Example of invention |
| 5-5 | 0.030 | 0.030 | 0 | 0 | 3800 | 470 | 590 | 830 | 680 | 6 | | | Example of invention |
| 5-6 | 0.030 | 0 | 0.030 | 0 | 3800 | 460 | 580 | 810 | 670 | 7 | | | Example of invention |
| 5-7 | 0.030 | 0 | 0 | 0.030 | 3700 | 470 | 580 | 830 | 670 | 7 | | | Example of invention |
| 5-8 | 0 | 0.030 | 0.030 | 0 | 3800 | 460 | 580 | 810 | 660 | 7 | | | Example of invention |
| 5-9 | 0 | 0.030 | 0 | 0.030 | 3700 | 460 | 590 | 830 | 680 | 7 | | | Example of invention |
| 5-10 | 0 | 0 | 0.030 | 0.030 | 3800 | 460 | 580 | 820 | 660 | 7 | | | Example of invention |
| 5-11 | 0.020 | 0.020 | 0.020 | 0 | 3700 | 470 | 580 | 830 | 670 | 6 | | | Example of invention |
| 5-12 | 0.020 | 0.020 | 0 | 0.020 | 3600 | 460 | 580 | 830 | 670 | 6 | | | Example of invention |
| 5-13 | 0.020 | 0 | 0.020 | 0.020 | 3700 | 450 | 580 | 820 | 660 | 7 | | | Example of invention |
| 5-14 | 0 | 0.020 | 0.020 | 0.020 | 3700 | 460 | 590 | 830 | 670 | 7 | | | Example of invention |
| 5-15 | 0.020 | 0.020 | 0.020 | 0.020 | 3500 | 450 | 590 | 810 | 660 | 6 | | | Example of invention |
| 5-16 | 0.080 | 0 | 0 | 0 | 2400 | 240 | 360 | 480 | 270 | 116 | | | Comparative example |
| 5-17 | 0 | 0 | 0.080 | 0.080 | 2000 | 100 | 120 | 160 | 90 | 163 | | | Comparative example |
| 5-18 | 0.080 | 0.080 | 0.080 | 0.080 | 1300 | 50 | 70 | 120 | 70 | 205 | | | Comparative example |

As is clear from Table 5, all the examples of the invention (Specimen Nos. 5-1 to 5-15) in which appropriate amounts of one or more selected from $ZrO_2$, $Ta_2O_5$, $HfO_2$, and $Nb_2O_5$ were added had excellent values: under the application of a direct-current magnetic field of 80 A/m, the incremental permeability $\mu\Delta$ was continuously 450 or more in a temperature range of 0 to 85° C. and the $\mu\Delta$ at 65° C. was 800 or more. Thus, these examples had characteristic values equivalent to or better than those of the example of the invention (Specimen No. 1-4) without such components.

However, in comparative examples (Specimen Nos. 5-16 to 5-18) in which at least one of the four components was added in large amounts more than the upper limit, exaggerated grain growth was caused and the incremental permeability $\mu\Delta$ under the application of a direct-current magnetic field of 80 A/m considerably decreased in the entire temperature range.

EXAMPLE 6

A calcined powder having the same composition as in Specimen No. 4-2 (note that adjustment was performed so as to achieve P: 2 mass ppm, B: 2 mass ppm, S: 3 mass ppm and Cl: 6 mass ppm) was mixed with zirconium oxide (in terms of $ZrO_2$), tantalum oxide (in terms of $Ta_2O_5$), hafnium oxide (in terms of $HfO_2$), and niobium oxide (in terms of $Nb_2O_5$) as sub-components such that the final compositions satisfied percentages in Table 6, and pulverized with a ball mill for 12 hours. The pulverized powders were mixed with polyvinyl alcohol, granulated at 180° C., and compacted into toroidal cores under the application of a pressure of 118 MPa. The compacts were then put into a kiln and fired at a maximum temperature of 1350° C. Thus, sintered cores having an outer diameter of 6.0 mm, an inner diameter of 3.0 mm, and a height of 4.0 mm (ideal specific surface: $4.44 \times 10^{-4}$ m$^2$/g) were obtained.

Each specimen obtained in this way was measured as in EXAMPLE 1 in terms of the incremental permeability $\mu\Delta$ at 0° C., 23° C., 65° C., and 85° C. under the application of a direct-current magnetic field of 80 A/m; the compressive rupture strength of the granulated powders; the ratio of (measured specific surface/ideal specific surface); the initial permeability $\mu_i$; and the average crystal grain size. The compressive rupture strength of the granulated powders was 0.90±0.05 MPa. The measured specific surface measured by a BET method (multipoint method) in JIS Z 8830 (2001) was in the range of 0.453 to 0.493 m$^2$/g. Thus, all the ratios of (measured specific surface/ideal specific surface) were in the range of 1020 to 1110, which were less than 1500.

The results are described in Table 6.

TABLE 6

| Specimen No. | Sub-components (mass %) ZrO$_2$ | Ta$_2$O$_5$ | HfO$_2$ | Nb$_2$O$_5$ | Initial permeability $\mu_i$ 23° C. | Incremental permeability under application of magnetic field of 80 A/m ($\mu\Delta$) 0° C. | 23° C. | 65° C. | 85° C. | Average crystal grain size (μm) | Compressive rupture strength of granulated powder (MPa) | Measured specific surface/ideal specific surface | Remarks |
|---|---|---|---|---|---|---|---|---|---|---|---|---|---|
| 4-2 | 0 | 0 | 0 | 0 | 3500 | 550 | 690 | 890 | 680 | 7 | 0.90 ± 0.05 | 1020-1110 | Example of invention |
| 6-1 | 0.050 | 0 | 0 | 0 | 3300 | 590 | 750 | 950 | 740 | 7 | | | Example of invention |
| 6-2 | 0 | 0.050 | 0 | 0 | 3300 | 590 | 730 | 950 | 750 | 7 | | | Example of invention |
| 6-3 | 0 | 0 | 0.050 | 0 | 3300 | 580 | 720 | 940 | 740 | 7 | | | Example of invention |
| 6-4 | 0 | 0 | 0 | 0.050 | 3300 | 610 | 750 | 960 | 750 | 7 | | | Example of invention |
| 6-5 | 0.030 | 0.030 | 0 | 0 | 3300 | 590 | 720 | 950 | 740 | 6 | | | Example of invention |
| 6-6 | 0.030 | 0 | 0.030 | 0 | 3300 | 590 | 720 | 950 | 750 | 7 | | | Example of invention |
| 6-7 | 0.030 | 0 | 0 | 0.030 | 3200 | 600 | 730 | 960 | 760 | 7 | | | Example of invention |
| 6-8 | 0 | 0.030 | 0.030 | 0 | 3300 | 600 | 730 | 970 | 750 | 7 | | | Example of invention |
| 6-9 | 0 | 0.030 | 0 | 0.030 | 3200 | 610 | 750 | 970 | 760 | 7 | | | Example of invention |
| 6-10 | 0 | 0 | 0.030 | 0.030 | 3300 | 600 | 740 | 960 | 750 | 7 | | | Example of invention |
| 6-11 | 0.020 | 0.020 | 0.020 | 0 | 3200 | 590 | 740 | 950 | 740 | 6 | | | Example of invention |
| 6-12 | 0.020 | 0.020 | 0 | 0.020 | 3100 | 600 | 730 | 960 | 760 | 6 | | | Example of invention |
| 6-13 | 0.020 | 0 | 0.020 | 0.020 | 3200 | 600 | 740 | 950 | 750 | 7 | | | Example of invention |
| 6-14 | 0 | 0.020 | 0.020 | 0.020 | 3200 | 600 | 730 | 950 | 750 | 7 | | | Example of invention |
| 6-15 | 0.020 | 0.020 | 0.020 | 0.020 | 3100 | 610 | 750 | 960 | 750 | 6 | | | Example of invention |
| 6-16 | 0 | 0 | 0 | 0.080 | 2300 | <u>270</u> | <u>370</u> | <u>510</u> | <u>250</u> | 103 | | | Comparative example |
| 6-17 | <u>0.080</u> | <u>0.080</u> | 0 | 0 | 1700 | <u>100</u> | <u>150</u> | <u>180</u> | <u>90</u> | 138 | | | Comparative example |
| 6-18 | <u>0.080</u> | <u>0.080</u> | <u>0.080</u> | <u>0.080</u> | 1100 | <u>90</u> | <u>120</u> | <u>140</u> | <u>80</u> | 197 | | | Comparative example |

As is clear from Table 6, in all the examples of the invention (Specimen Nos. 6-1 to 6-15) in which appropriate amounts of one or more selected from ZrO$_2$, Ta$_2$O$_5$, HfO$_2$, and Nb$_2$O$_5$ were added, generation of coarse crystal grains is suppressed and the incremental permeability $\mu\Delta$ under the application of a direct-current magnetic field of 80 A/m increased. Due to a synergistic effect provided by the addition of CoO, these examples had particularly excellent characteristic values: the incremental permeability $\mu\Delta$ was continuously 550 or more in a temperature range of 0 to 85° C. and the $\mu\Delta$ at 65° C. was 900 or more. Thus, these examples had $\mu\Delta$ values equivalent to or higher than those of the example of the invention (Specimen No. 4-2) without such components.

However, in comparative examples (Specimen Nos. 6-16 to 6-18) in which at least one of the four components was added in large amounts more than the upper limit, exaggerated grain growth was caused and the incremental permeability $\mu\Delta$ under the application of a direct-current magnetic field of 80 A/m considerably decreased in the entire temperature range.

INDUSTRIAL APPLICABILITY

According to the present invention, a Mn—Zn ferrite core having excellent characteristics can be obtained in which, under the application of a direct-current magnetic field of 80 A/m, the incremental permeability $\mu\Delta$ is continuously 400 or more in a wide temperature range of 0 to 85° C. and the incremental permeability $\mu\Delta$ at 65° C. is 700 or more. Such a Mn—Zn ferrite core is advantageously applicable to, for example, a magnetic core of a pulse transformer in an Ethernet device.

The invention claimed is:

1. A Mn—Zn ferrite core comprising a basic component, subcomponents, and unavoidable impurities, wherein, as the sub-components,
   silicon oxide (in terms of SiO$_2$): 50 to 400 mass ppm and
   calcium oxide (in terms of CaO): 50 to 4000 mass ppm are added to the basic component consisting of
   iron oxide (in terms of Fe$_2$O$_3$): 51.0 to 54.5 mol %,
   zinc oxide (in terms of ZnO): 8.0 to 12.0 mol %, and
   manganese oxide (in terms of MnO): balance;
amounts of phosphorus, boron, sulfur, and chlorine in the unavoidable impurities are reduced as follows
   phosphorus: less than 3 mass ppm,
   boron: less than 3 mass ppm,
   sulfur: less than 5 mass ppm, and
   chlorine: less than 10 mass ppm; and a ratio of a measured specific surface of the Mn—Zn ferrite core to an ideal specific surface of the Mn—Zn ferrite core satisfies formula (1) below $$\text{Measured specific surface/ideal specific surface} < 1500 \quad (1)$$

where the measured specific surface represents a specific surface (m²/g) determined by a BET method (multipoint method) in JIS Z 8830 (2001); and the ideal specific surface represents a specific surface (m²/g) calculated from size and mass of the core on an assumption that the core is in an ideal state of having no cavities.

2. The Mn—Zn ferrite core according to claim 1, wherein the sub-components further include Cobalt oxide (in terms of CoO): 50 to 3000 mass ppm.

3. The Mn—Zn ferrite core according to claim 1, wherein the sub-components further include one or more selected from zirconium oxide (in terms of $ZrO_2$): 0.005 to 0.075 mass %;
tantalum oxide (in terms of $Ta_2O_5$): 0.005 to 0.075 mass %;
hafnium oxide (in terms of $HfO_2$): 0.005 to 0.075 mass %; and
niobium oxide (in terms of $Nb_2O_5$): 0.005 to 0.075 mass %.

4. A method for producing the Mn—Zn ferrite core according to claim 1, the method comprising calcining the basic component to provide a calcined powder, mixing the calcined powder with the subcomponents, subsequently granulating the mixture of the calcined powder with the sub-components into a granulated powder having a compressive rupture strength of 1.10 MPa or less, and then compacting and subsequently firing the granulated powder.

5. The Mn—Zn ferrite core according to claim 2, wherein the sub-components further include one or more selected from zirconium oxide (in terms of $ZrO_2$): 0.005 to 0.075 mass %;
tantalum oxide (in terms of $Ta_2O_5$): 0.005 to 0.075 mass %;
hafnium oxide (in terms of $HfO_2$): 0.005 to 0.075 mass %; and
niobium oxide (in terms of $Nb_2O_5$): 0.005 to 0.075 mass %.

6. A method for producing the Mn—Zn ferrite core according to claim 2, the method comprising calcining the basic component to provide a calcined powder, mixing the calcined powder with the subcomponents, subsequently granulating the mixture of the calcined powder with the sub-components into a granulated powder having a compressive rupture strength of 1.10 MPa or less, and then compacting and subsequently firing the granulated powder.

7. A method for producing the Mn—Zn ferrite core according to claim 3, the method comprising calcining the basic component to provide a calcined powder, mixing the calcined powder with the subcomponents, subsequently granulating the mixture of the calcined powder with the sub-components into a granulated powder having a compressive rupture strength of 1.10 MPa or less, and then compacting and subsequently firing the granulated powder.

* * * * *